United States Patent [19]
Achtermann et al.

[11] 4,454,469
[45] Jun. 12, 1984

[54] MEASUREMENT OF VARIATIONS IN THE DISTANCE BETWEEN A COLOR SELECTION ELECTRODE AND A DISPLAY WINDOW OF A COLOR DISPLAY TUBE

[75] Inventors: Bernhard Achtermann, Stolberg-Dorff; Hans L. Kutscher, Aachen-Brand; Hans Lankes, Aachen, all of Fed. Rep. of Germany

[73] Assignee: U.S. Philips Corporation, New York, N.Y.

[21] Appl. No.: 421,935

[22] Filed: Sep. 23, 1982

Related U.S. Application Data

[63] Continuation of Ser. No. 152,973, May 23, 1980, abandoned, which is a continuation of Ser. No. 921,798, Jul. 3, 1978, abandoned.

[30] Foreign Application Priority Data

Jul. 14, 1977 [DE] Fed. Rep. of Germany ....... 2731752

[51] Int. Cl.³ .......................................... G01R 27/26
[52] U.S. Cl. ................................. 324/61 P; 361/281
[58] Field of Search .......................... 324/61 P, 61 R; 361/280, 281

[56] References Cited

U.S. PATENT DOCUMENTS 2,802,178  8/1957  Shafer et al. ............... 324/61 R
3,400,331  9/1968  Harris ........................ 324/61 R

FOREIGN PATENT DOCUMENTS 985428  3/1965  United Kingdom ............. 324/61 P

Primary Examiner—Ernest F. Karlsen
Attorney, Agent, or Firm—Robert J. Kraus

[57] ABSTRACT

The invention relates to a method of capacitively measuring variations in the previously adjusted nominal distance between the facing surfaces of a color selection electrode and a display window of given nominal glass thickness of a color television display tube. In this method, the distance is determined by measuring the capacitance of a capacitor electrode is formed by the color selection electrode and a measuring electrode which is disposed on the outer surface of the window and is surrounded by a screening electrode. The outside dimensions of the screening electrode are chosen so that, capacitance variations due to variations in the thickness of in the window are negligible in comparison to capacitance variations due to variations in the previously adjusted nominal distance between the facing surfaces of the color selection electrode and the window. The invention also relates to a device for carrying out the method.

13 Claims, 3 Drawing Figures

MEASUREMENT OF VARIATIONS IN THE DISTANCE BETWEEN A COLOR SELECTION ELECTRODE AND A DISPLAY WINDOW OF A COLOR DISPLAY TUBE

This is a continuation, of application Ser. No. 152,973, filed May 23, 1980 now abandoned, which is a continuation of Ser. No. 921,798, filed July 3, 1978, now abandoned.

BACKGROUND OF THE INVENTION

The invention relates to a method of determining variations in the previously adjusted nominal distance between the facing surface of a colour selection electrode and a display window of a given nominal glass thickness of a colour television display tube.

The invention also relates to a device for carrying out this method.

Non-electric quantities, for example distances, can be measured electrically by means of capacitance determinations. Such measurements, however, are difficult to make in particular, in the case of small distances. In the book by Kautsch "Messelektronik nicht-elektrischer Grössen", volume 3, pp. 98, 99, the principle is explained of the measurement of a layer thickness of a dielectric and a formula is derived for the capacity of a capacitor which is filled with two dielectrics. Furthermore, it is known from the book by F. Kohlrausch "Praktische Physik", volume 2, page 237 to use for the accurate measurement of the dielectric properties of plate-shaped insulators a so-called screening capacitor in which one capacitor plate is a metal plate and the other one is a circular electrode surrounded by an annular screening electrode and a plate-shaped electrode surrounded by a screening electrode, respectively.

Furthermore, German Auslegeschrift No. 2,041,044 discloses a capacitor in which one capacitor plate is surrounded by a screening electrode and which is used for measuring very small capacitance variations.

As described in the above-mentioned book by Kautsch, the capacitance C between a measuring electrode and a metal plate is inversely proportional to the distance a between the measuring electrode and the metal plate. This means that a variation in the distance a also results in a capacitance variation because as a matter of fact it holds that:

$$C = \frac{\epsilon \epsilon_o F}{a} \quad (1)$$

where $\epsilon$ is the dielectric constant of the medium between the plates and F is the surface area of the measuring electrode. Thus by measuring the capacitance, the distance a is directly obtained. The measurement is the more accurate as the medium between the actual measuring electrode and the opposite electrode is more homogeneous. When a screening electrode is used which may consist, for example, of an annular thin metal plate, a substantially homogeneous measuring field is obtained. The distance between the measuring electrode and the screening electrode should be chosen to be as small as possible in order that no inhomogeneous peripheral disturbances can occur at said areas.

When the measuring space is filled with two different dielectrics formed from planeparallel plates, in which one dielectric has a dielectric constant $\epsilon_1$ and a layer thickness $a_1$ and the other dielectric has a dielectric constant $\epsilon_2$ and a layer thickness $a_2$, it holds for the overall capacitance that:

$$C_t = C_1 C_2 / (C_1 + C_2) \text{ in which } C_1 = \frac{\epsilon_o \epsilon_1 F}{a_1} \text{ and } C_2 = \frac{\epsilon_o \epsilon_2 F}{a_2}$$

From this it follows that:

$$\frac{\epsilon_o F}{C_t} = \frac{a_1}{\epsilon_1}\left(1 + \frac{a_2 \epsilon_1}{a_1 \epsilon_2}\right) \quad (2)$$

The distance $a_1$ is then given by $$a_1 = \epsilon_1 \left(\frac{\epsilon_o F}{C_t} - \frac{a_2}{\epsilon_2}\right) \quad (3)$$

Such a configuration of two dielectrics is encountered in the manufacture of colour television display tubes having a colour selection electrode which is positioned at a small distance from a glass display window. One dielectric is formed by the glass display window and the other dielectric is formed by the medium between the facing surfaces of the glass display window and the colour selection electrode. For true color reproduction it is important during manufacture of a colour television display tube to accurately establish whether the distance between the facing surfaces of the display window and the colour selection electrode corresponds to the previously adjusted nominal distance. When it is determined by means of a capacitance measurement, the distance in the above formula (3) is equal to $a_1$. The glass thickness of the display window then is equal to $a_2$. The distance $a_1$ can be measured accurately only if the distance $a_2$ is known accurately. However, in a display window of a colour television display tube, variations occur in the glass thickness, which in turn result in variations in the measured distance between the colour selection electrode and the display window. With $\epsilon_1 \approx 1$ (air) and $\epsilon_2 \approx 7$ (glass) a variation in the glass thickness of, for example, 1 mm causes an error of approximately 140 $\mu$m in the measured distance between the colour selection electrode and the display window, as follows from the above formula (3). During the manufacture of a colour television display tube, however, a greater accuracy is required for determining the distance. It should be possible to establish deviations of approximately 30 $\mu$m from the previously adjusted nominal distance between the colour selection electrode and the display window.

SUMMARY OF THE INVENTION

It is therefore an object of the invention to provide a method for measuring the distance between the facing surfaces of a display window and a colour selection electrode of a colour television display tube which minimizes errors due to variations in the glass thickness of the display window.

A further object of the invention is to provide a device for carrying out such a method.

According to the invention, a method of the kind mentioned in the first paragraph is characterized in that the capacitance of a capacitor is measured by means of an alternating voltage. One electrode of the capacitor is formed by the colour selection electrode and the other electrode is formed by a metal measuring electrode disposed on the surface of the display window remote from the colour selection electrode. The measuring electrode is surrounded by a metal screening electrode whose outer dimensions have a value such that variations in the glass thickness of the display window up to at most 15% of the nominal glass thickness result in a negligible capacitance variation of the capacitor with respect to negligible capacitance variation due to distance variations in the previously adjusted nominal distance between the facing surfaces of the colour selection electrode and the display window.

Negligible is to be understood to mean herein that a capacitance variation which corresponds to a distance variation of approximately 30 $\mu$m in the nominal distance between the facing surfaces of the display window and the colour selection electrode is recognizable as such. This means that a capacitance variation as a result of a variation of 15% in the glass thickness is smaller than a capacitance variation as a result of a variation of approximately 30 $\mu$m with respect to the nominal distance between the colour selection electrode and display window.

The invention is based on the recognition obtained from investigations that the inhomogeneity of the electric field between the measuring electrode and the colour selection electrode influences the error in the distance to be measured between the facing surfaces of the display window and the colour selection electrode. The inhomogeneity of the measuring field is determined by the outside dimensions of the screening electrode. The error in the distance to be measured between the facing surfaces of the display window and the colour selection electrode as a result of variations in glass thickness can be minimized by an appropriate choice of the outside dimensions of the screening electrode.

For display windows having nominal glass thicknesses between approximately 8 mm and 13 mm and for a nominal distance between the facing surfaces of the colour selection electrode and the display window between approximately 8 mm and 14 mm, according to the invention the outside dimensions of the metal screening electrode are chosen so as to increase substantially linearly with the nominal distance. For a colour television display tube having a nominal glass thickness of approximately 12 mm and a nominal distance between the facing surfaces of the display window and the colour selection electrode between 8 mm and 14 mm, a suitable value for the outside dimensions of the screening electrode is between approximately 85 mm and 100 mm this value being determined according to a substantially linearly increasing relation with the nominal distance. In a method according to the invention, variations of approximately 30 $\mu$m in the nominal distance between the facing surfaces of the display window and the colour selection electrode can be measured.

A circular thin metal plate is preferably chosen for the measuring electrode and an annular thin metal plate is preferably chosen for the screening electrode.

The outside dimensions of the measuring electrode are preferably between approximately 14 mm and 30 mm. The outside dimensions of the measuring electrode are preferably approximately 26 mm. The dimensions of the measuring electrode with respect to the optimum dimensions of the screening electrode have been found not to be very critical.

A device for carrying out the method according to the invention comprises an open housing having, on the open side, a rim of a flexible material, a supporting member made of a flexible layer of a synthetic resin and supported in the housing by a flexible ring, a metal measuring electrode is provided on the non-supported side of the supporting member and is surrounded by a metal screening electrode means provided in the wall of the housing to evacuate the housing, and means to supply electric potentials to the measuring electrode and screening electrode.

The said metal measuring electrode and metal screening electrode are preferably manufactured from thin copper sheets the surface of which is reinforced by means of rhodium. The free surface of the metal measuring electrode and metal screening electrode is preferably covered with a 2 $\mu$m thick layer of gold.

BRIEF DESCRIPTION OF THE DRAWING

The invention will now be described in greater detail with reference to the accompanying drawing, in which.

DESCRIPTION OF THE PREFERRED EMBODIMENTS

Figure 1:
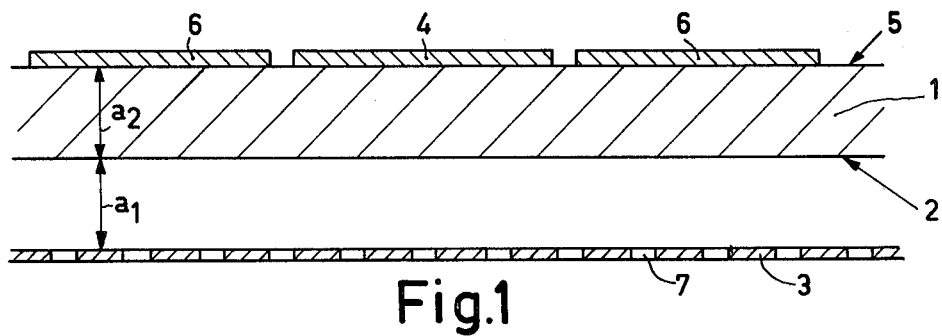
FIG. 1 illustrates the principle of the method according to the invention.

FIG. 1 is a cross-sectional view of a portion of a display window 1 of a colour television display tube. The thickness of the display window 1 is $a_2$. A metal colour selection electrode 3 with apertures 7 is positioned at a distance $a_1$ from the inner surface 2 of the display window 1. As is known, phosphors luminescing in red, green and blue are provided on the inner surface 2 of window 1. For a true colour reproduction, it is necessary for the colour selection electrode to be accurately positioned at a prescribed nominal distance $a_1$ from the inner surface 2 of the display window 1. The measurement of this distance is carried out by the measurement of the capacitance of a capacitor. One electrode of the capacitor is formed by a metal measuring electrode 4 disposed on the outer surface 5 of the display window 1. The measuring electrode 4 is surrounded by a metal screening electrode 6. The other electrode of the capacitor is formed by the colour selection electrode 3. If the glass thickness $a_2$ of the display window 1 is constant so that the contribution of the display window to the overall capacitance is constant, capacitance variations are then the direct result of variations in the distance $a_1$. However, if variations occur in the glass thickness $a_2$, a capacitance variation also occurs. From the measurement itself it cannot be determined whether the capacitance variation is due to the variation in the glass thickness $a_2$ or a variation in the distance $a_1$.

A solution to this problem is given by the method according to the invention. In such a method, capacitance variations due to variations in glass thickness are negligible with respect to capacitance variations produced by variations in the distance $a_1$. For this purpose, for each given nominal value of $a_1$ and $a_2$, a value of the outside dimensions of the screening electrode 6 is chosen such that the error in the distance $a_1$ as a result of variations in glass thickness is minimized.

Assuming, for example, that the thickness of the display window 1 is approximately 12 mm and the colour selection electrode 3 is positioned at a distance of approximately 9 mm from the inner surface 2 of the display window 1, a screening electrode having outside dimensions of approximately 90 mm must be chosen. When the thickness of the display window remains the same, the outside dimensions of the screening electrode 6 must be chosen so as to be substantially linearly increasing and decreasing, respectively, when the nominal distance between the inner surface 2 of the display window 1 and the colour selection electrode 3 becomes larger and smaller, respectively. For other nominal values of the glass thickness of the display window between approximately 8 and 13 mm it also holds that the outside dimensions of the screening electrode must be chosen to be linearly increasing with increasing nominal distance between the colour selection electrode 3 and the inner surface 2 of the display window 1.

The value of the dimensions of the measuring electrode 4 is determined substantially by the area of the surface over which variations in the distance between the inner surface 2 of the display window 1 and the colour selection electrode 3 are to be determined. In addition, the value of the capacitance and hence the sensitivity of the measurement is determined by the size of the measuring electrode 4. The dimensions of the measuring electrode with respect to the optimum dimensions of the screening electrode are not particularly critical.

The measuring electrode is preferably chosen to be circular and the screening electrode to be annular.

Figure 2:
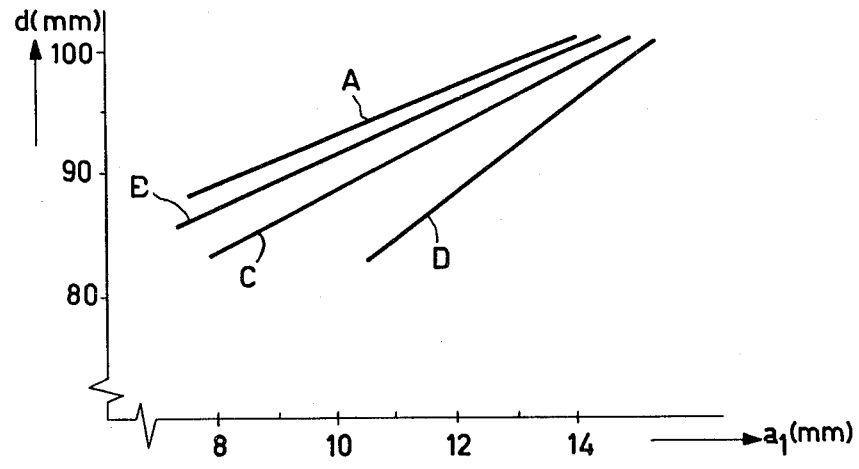
FIG. 2 shows the relation between the outside dimensions d of the screening electrode and the optimum distance $a_1$.

For the case of a circular measuring electrode having a diameter of approximately 26 mm and an annular screening electrode, FIG. 2 shows the linear relationship for a number of nominal glass thicknesses of the display window between the outside diameter d of the screening electrode and the nominal distance $a_1$ between the facing surfaces of the colour selection electrode and the display window, in which the error in this distance is minimum. The lines denoted in FIG. 2 by A, B, C and D, respectively, correspond to nominal glass thicknesses of 13, 12, 11 and 10 mm, respectively. For each combination of a nominal distance between the facing inner surfaces of the colour selection electrode and the display window between approximately 8 and 14 mm and a nominal glass thickness of the display window between 8 and 13 mm, an outside diameter of the screening electrode can be chosen in which the error in the capacitively measured distance $a_1$ according to the method shown in FIG. 1 due to variations in glass thickness is minimum. From FIG. 2 it can be derived in a simple manner what outside diameter has to be selected with a given nominal value of the glass thickness of the display window with a previously determined nominal value for the distance between the display window and the colour selection electrode.

As stated previously, the choice of the diameter of the measuring electrode is determined by the size of the surface over which and the sensitivity with which variations in the distance between the colour selection electrode and the display window must be measured. The diameter of the measuring electrode with respect to the optimum outside dimensions of the screening electrode is not very critical. It has been found that for diameters of the measuring electrode between approximately 14 mm and 30 mm, the same optimum diameter of the screening electrode can be used.

Figure 3:
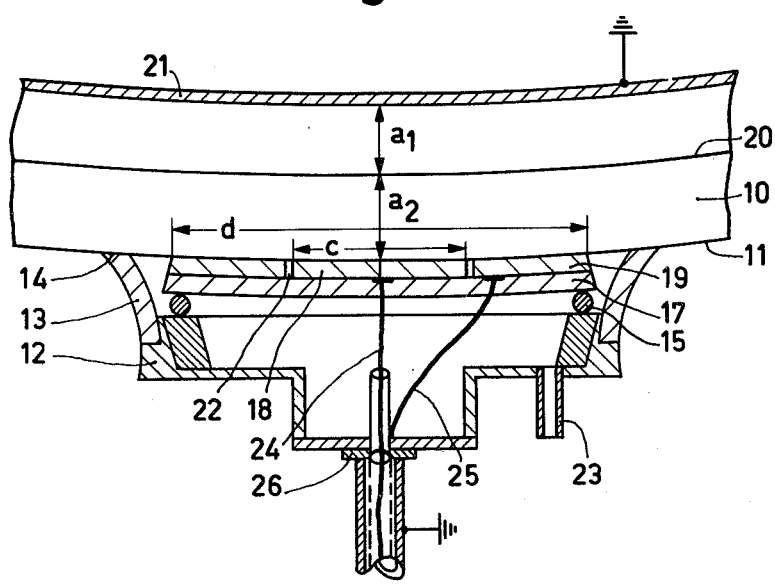
FIG. 3 is a cross-sectional view of a device for carrying out the method according to the invention.

FIG. 3 is a cross-sectional view of a device for carrying out the method according to the invention. The device is provided on the outer surface 11 of the display window 10 and comprises a box-like holder or housing 12. The open side of the holder 12 has a rubber rim 13. The end 14 of the rim 13 is considerably flattened so as to be in a vacuum-tight engagement with the outer surface 11 of the display window 10. The holder 12 may be made from a metal or a synthetic resin. If the holder 12 is of synthetic resin, the flexible rim may advantageously form part of the holder 12. A supporting member 17 which is supported by a rubber ring 15 is provided in the holder 12. The supporting member 17 is a flexible layer of synthetic resin, for example epoxy resin, which bears on the flexible ring 15. A measuring electrode 18 having a diameter c of 26 mm is provided on the supporting member 17. A screening electrode 19 having a diameter d of 90 mm surrounds the measuring electrode 18. The measuring electrode 18 and the screening electrode 19 consist of thin copper sheets the surface of which is reinforced by means of rhodium and the free surface of which is covered with a 2 $\mu$m thick layer of gold.

The measuring electrode 18 may, for example, be circular with a diameter between 14 and 30 mm. The diameter d of the screening electrode 19 is determined by the nominal glass thickness $a_2$ and the previously adjusted distance $a_1$ between the inner surface 20 of the display window 10 and the colour selection electrode 21. In the present case, $a_1 = 9$ mm and $a_2 = 12$ mm. The thickness of the supporting member 17 is approximately 400 $\mu$m. The thickness of the measuring electrode 18 and the screening electrode 19 is approximately 18 $\mu$m. Disposed between the measuring electrode 18 and the screening electrode 19 is a small annular slot 22 having a width of approximately 80 $\mu$m. The slot 22 may be filled with a ring of a synthetic resin so as to maintain a good mutual position of the measuring electrode 18 and the screening electrode 19.

In order to prevent contamination of the slot 22 and, hence, a shortcircuit between the measuring electrode 18 and the screening electrode 19, the electrodes may be covered with a thin layer of synthetic resin. A shortcircuit between the measuring electrode 18 and the screening electrode 19, may also be prevented by first covering the measuring electrode 18 with an insulating layer of a synthetic resin having a thickness of, for example, 400 $\mu$m. The screening electrode 19 is then provided on the layer of synthetic resin. In this case the circular aperture in the screening electrode 19 must be provided with an insulator which can withstand detrition, for example quartz.

In order to ensure a rigid engagement between the electrodes and the outer surface 11 of the display window 10, the holder is evacuated via an exhaust connection 23 provided in the wall. The leads 24 and 25 for applying electric voltages to the measuring electrode 18 and the screening electrode 19 and are passed through the wall of the holder 12 via a vacuum-tight connection 26.

The capacitance measurement capacitance is carried out by means of known methods, for example, by means of a bridge circuit which is fed with alternating voltage.

The device of the invention makes it possible to measure variations of approximately 30 $\mu$m in the distance between the inner surface 20 of the display window 10 and the colour selection electrode 21.

What is claimed is:

1. A method of capacitively measuring variations in a previously-adjusted nominal distance between facing surfaces of a color selection electrode and a display window for a display tube, said method comprising the steps of:
- (a) positioning a measuring electrode on the surface of the window remote from the color selection electrode;
- (b) positioning a screening electrode on said remote surface of said window, said screening electrode surrounding the measuring electrode and having a predetermined outer dimension relative to said nominal distance and a nominal thickness of the window;
- (c) applying to the measuring electrode an alternating voltage referenced to the color selection electrode and the screening electrode; and
- (d) measuring the capacitance between the color selection electrode and the measuring electrode;

said screening electrode's predetermined outer dimension being selected such that it influences the homogeneity of the electric field produced by the alternating voltage to degree sufficient to minimize the influence of variations in window thickness on the measured capacitance.

2. A method as in claim 1 where the nominal glass thickness is between approximately 8 mm and 13 mm, the nominal distance is between approximately 8 mm and 14 mm, and the predetermined outer dimension of said screening electrode increases linearly with said nominal distance.

3. A method as in claim 2 where the outer dimension of the screening electrode is between approximately 85 mm and 100 mm and where the nominal glass thickness is approximately 12 mm.

4. A method as in claim 1 where the measuring electrode comprises a circular plate and the screening electrode comprises an annular electrode disposed about said measuring electrode.

5. A method as in claim 4 where the diameter of the measuring electrode is between 14 mm and 30 mm.

6. An apparatus for capacitively measuring the distance between a color selection electrode and a window panel of a display tube, said apparatus comprising a housing having a flexible wall portion defining an opening in said housing and being adapted to engage, in a vacuum-tight manner, the exterior surface of said window panel, a measuring electrode disposed in said housing adjacent said opening, a screening electrode disposed about and surrounding said measuring electrode, conduit means for evacuating the interior of said housing, and means for flexibly supporting said measuring and screening electrodes so that they are pressed into engagement with said exterior surface of said window panel upon engagement of said wall portion with said exterior surface and evacuation of said housing, and means for applying an alternating voltage to said measuring electrode.

7. The apparatus according to claim 6 wherein, for a given nominal distance between the facing surfaces of the color selection electrode and the window panel, said screening electrode has an outer dimension such that variations in the thickness of said window panel up to at most 15% of a nominal thickness produces a negligible change in capacitance between said measuring electrode and said color selection electrode in comparison with changes in capacitance therebetween due to variations in the distance between said facing surfaces.

8. The apparatus according to claim 6, wherein said support means includes a flexible, planar member disposed adjacent the surfaces of said measuring and screening electrodes remote from said opening and a flexible ring disposed between said support member and the wall of said housing.

9. The apparatus according to claim 7, wherein said support means includes a flexible, planar member disposed adjacent the surfaces of said measuring and screening electrodes remote from said opening and a flexible ring disposed between said support member and the wall of said housing.

10. The apparatus according to claim 8, wherein said measuring and screening electrodes are made from copper and have a rhodium reinforced surface.

11. The apparatus according to claim 9, wherein said measuring and screening electrodes are made from copper and have a rhodium reinforced surface.

12. The apparatus according to claim 8, wherein the surfaces of said measuring and screening electrodes remote from said opening are coated with a gold layer.

13. The apparatus according to claim 9, wherein the surfaces of said measuring and screening electrodes remote from said opening are coated with a gold layer.

* * * * *